United States Patent
Sato et al.

(10) Patent No.: US 6,727,799 B1
(45) Date of Patent: Apr. 27, 2004

(54) COMMUNICATION CONTROL METHOD AND ELECTRONIC EQUIPMENTS

(75) Inventors: Makoto Sato, Tokyo (JP); Harumi Kawamura, Tokyo (JP); Hisato Shima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/326,174

(22) Filed: Jun. 4, 1999

Related U.S. Application Data

(63) Continuation of application No. 08/738,596, filed on Oct. 29, 1996, now abandoned.

(30) Foreign Application Priority Data

Oct. 31, 1995 (JP) ............................................. 7-306724

(51) Int. Cl.⁷ ................................................ H04Q 1/00
(52) U.S. Cl. .................... 340/3.1; 340/3.7; 340/825.24; 340/825.25
(58) Field of Search .................. 340/825.68, 825.25, 340/825.24, 825.96, 825.72, 525.07, 3.1, 3.7, 3.71; 346/400.1; 370/360, 364, 362, 480, 489, 490, 389, 503, 471, 252, 391, 400; 455/67.1; 386/90; 395/200.57, 200.68, 200.79, 200.83, 280

(56) References Cited

U.S. PATENT DOCUMENTS

| | | | | |
|---|---|---|---|---|
| 4,764,981 A | * | 8/1988 | Miyahara et al. ...... | 340/825.69 |
| 4,907,070 A | * | 3/1990 | Wesolowski ............... | 386/90 |
| 5,434,862 A | * | 7/1995 | Lokhoff ................. | 340/825.07 |
| 5,483,656 A | * | 1/1996 | Oprescu et al. ............. | 700/297 |
| 5,499,018 A | * | 3/1996 | Welmer ................. | 340/825.07 |
| 5,535,208 A | * | 7/1996 | Kawakami et al. ......... | 370/391 |
| 5,563,886 A | * | 10/1996 | Kawamura et al. ......... | 370/257 |
| 5,633,871 A | * | 5/1997 | Bloks ......................... | 370/471 |
| 5,689,244 A | * | 11/1997 | Iijima et al. ........... | 340/825.07 |
| 5,724,517 A | * | 3/1998 | Cook et al. ............ | 395/200.57 |

* cited by examiner

Primary Examiner—Edwin C. Holloway, III
(74) Attorney, Agent, or Firm—Frommer Lawrence & Haug LLP; William S. Frommer; Gordon Kessler

(57) ABSTRACT

When a controller controls a target, a useless communication is eliminated, and control is made easier at the same time. When a personal computer sends a command demanding a VTR to execute 'REWIND', the VTR returns a response notifying of an OK for the demand and starts 'REWIND' in an inside recording/playback system at the same time. When the mechamode changes from 'REWIND' to 'STOP', the VTR generates an event and reports the change to the personal computer. Upon receipt of this event, the personal computer immediately sends a command demanding to set the mechamode to 'PLAY' to the VTR. Upon receipt of this command, the VTR returns a response notifying of an OK for the command and also sets the mode of the recording/playback system to 'PLAY'.

2 Claims, 14 Drawing Sheets

| | CTS | CT/RC | HA | OPC | OPR | OPR | OPR | OPR |
|---|---|---|---|---|---|---|---|---|
| FIG. 1A COMMAND TO VTR | "0"h | CONTROL | VTR SUBDEVICE | EVENT ON | MECHA MODE | TIME CODE | | |
| FIG. 1B RESPONSE FROM VTR | "0"h | ACCEPT | VTR SUBDEVICE | EVENT ON | MECHA MODE | TIME CODE | | |
| FIG. 1C TIME CODE EVENT FROM VTR | "0"h | EVENT | VTR SUBDEVICE | TIME CODE | CURRENT VALUE | "0" HOUR | "25" MINUTE | "50" SECOND | "00" FRAME |
| FIG. 1D COMMAND TO TV | "0"h | CONTROL | DEVICE | EVENT OFF | INPUT MODE | | | |
| FIG. 1E RESPONSE FROM TV | "0"h | ACCEPT | DEVICE | EVENT OFF | INPUT MODE | | | |
| FIG. 1F COMMAND TO SET TOP BOX | "0"h | CONTROL | TUNER SUBDEVICE | EVENT ON (BROADCAST) | RECEPTION CH | | | |
| FIG. 1G RESPONSE FROM SET TOP BOX | "0"h | ACCEPT | TUNER SUBDEVICE | EVENT ON (BROADCAST) | RECEPTION CH | | | |
| FIG. 1H RECEIVE CH EVENT FROM SET TOP BOX | "0"h | EVENT | TUNER SUBDEVICE | RECEPTION CH | 'CH6' | | | |

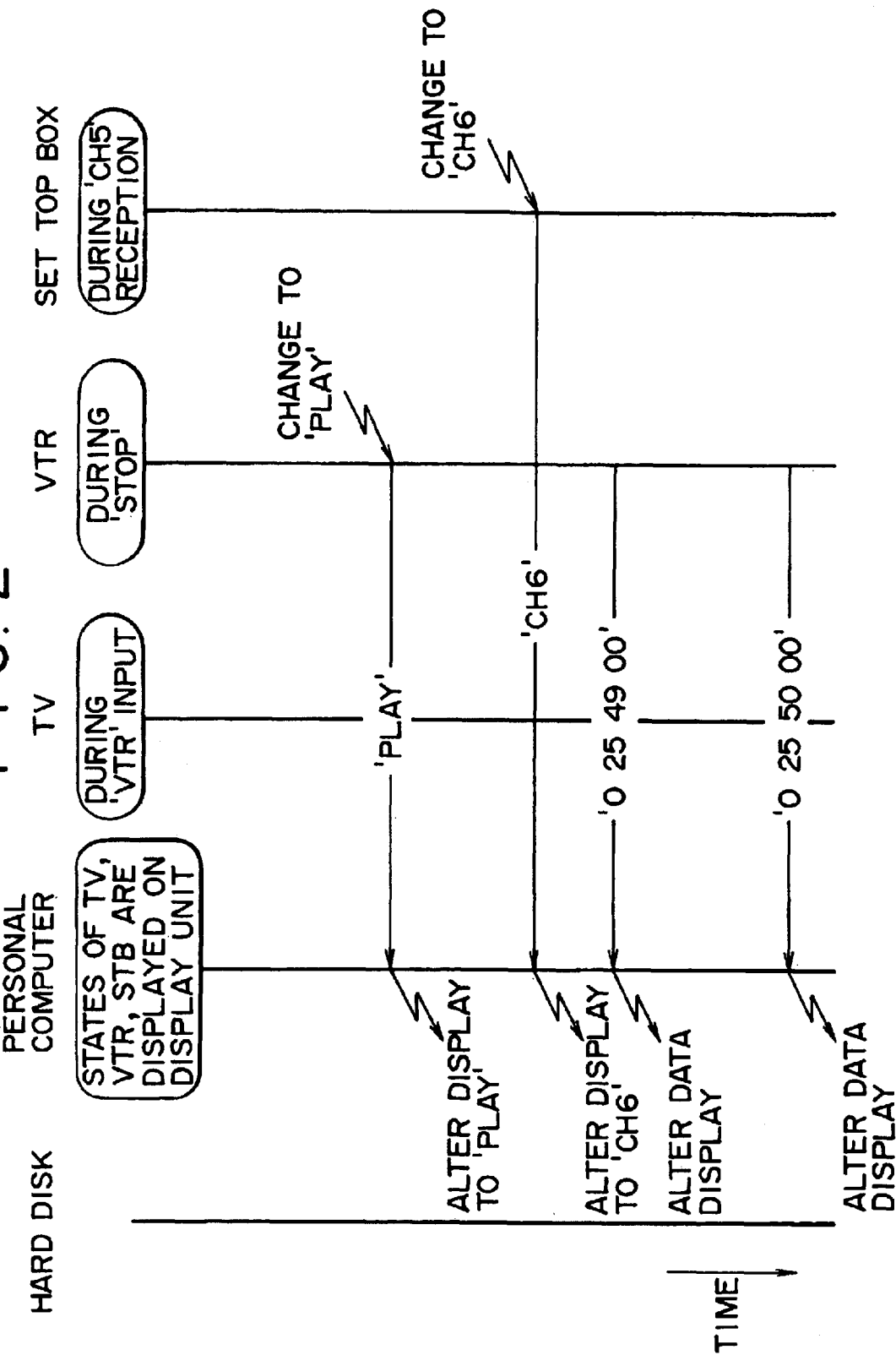

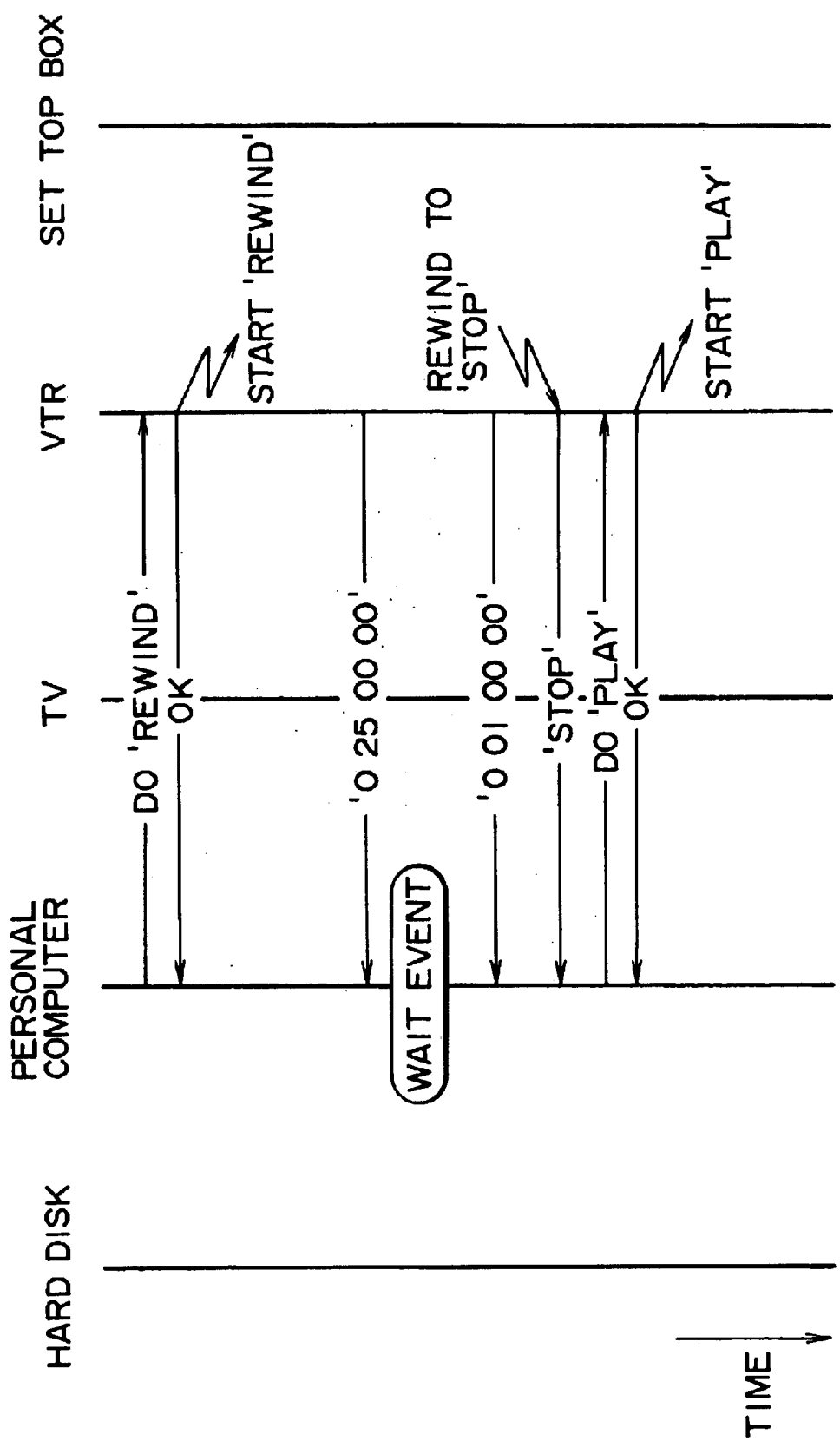

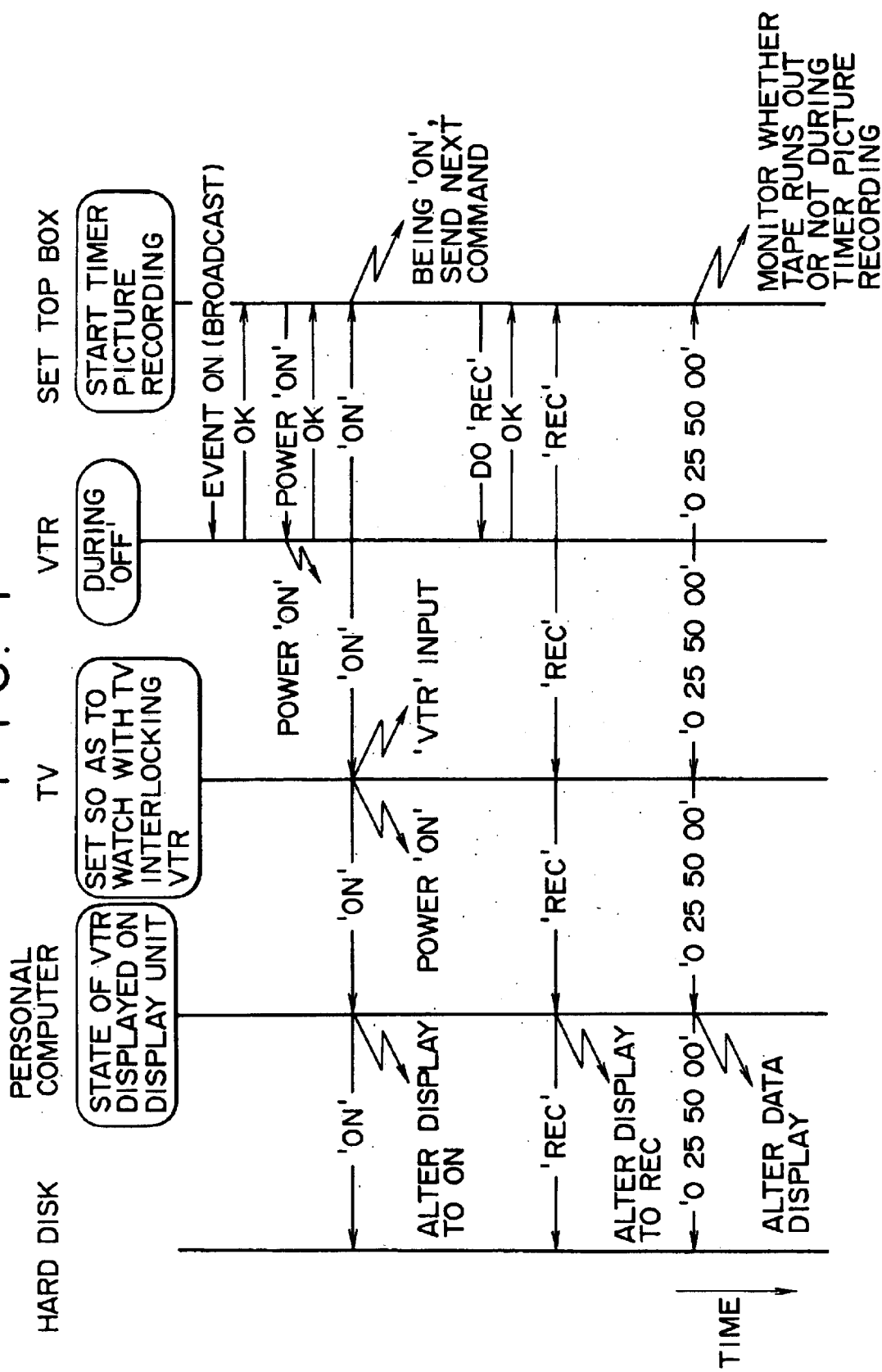

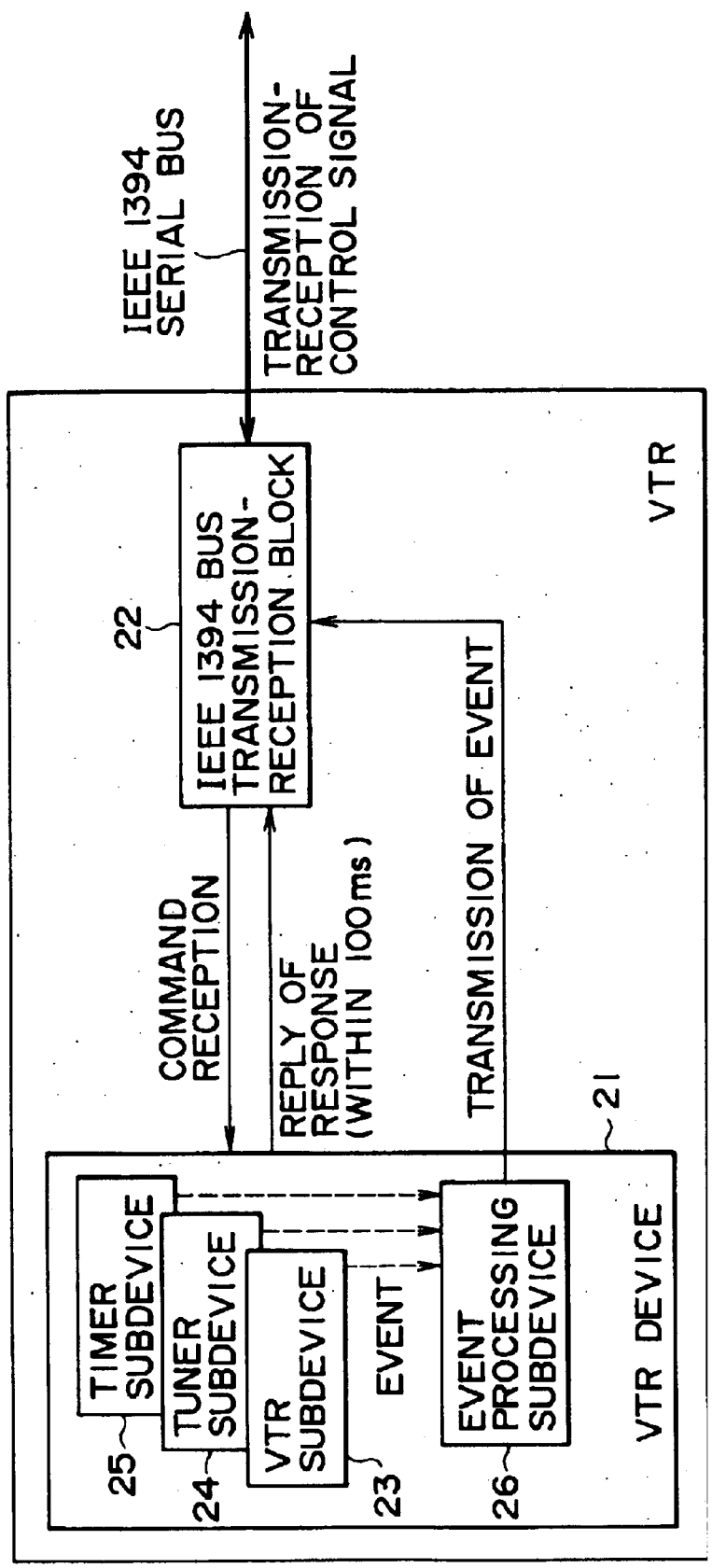

FIG. 6A  COMMAND TO VTR

| "0"h | CONTROL | EVENT ON/OFF | VTR SUBDEVICE | MECHAMODE | TIME CODE |
|---|---|---|---|---|---|
| CTS CT/RC | HA | OPC | OPR | OPR | OPR |

EVENT PROCESSING SUBDEVICE

FIG. 6B  COMMAND TO SET TOP BOX

| "0"h | CONTROL | EVENT ON/OFF | TUNER SUBDEVICE | RECEPTION CH |
|---|---|---|---|---|

EVENT PROCESSING SUBDEVICE

FIG. 6C  COMMAND TO TV

| "0"h | CONTROL | EVENT ON/OFF | DEVICE | INPUT MODE |
|---|---|---|---|---|

EVENT PROCESSING SUBDEVICE

FIG. 6D  MECHAMODE OF VTR

| "0"h | EVENT | VTR SUBDEVICE | 'PLAY' | 'Forward' |
|---|---|---|---|---|

EVENT PROCESSING SUBDEVICE

| | CTS | CT/RC | HA | OPC | OPR |
|---|---|---|---|---|---|
| COMMAND TO VTR | "0"h | REPORT INQUIRY | VTR SUBDEVICE | MECHAMODE | DUMMY |

FIG. 7A

| | | | | | |
|---|---|---|---|---|---|
| RESPONSE 1 FROM VTR | "0"h | NOW | VTR SUBDEVICE | 'WIND' | 'REWIND' |

FIG. 7B

| | | | | | |
|---|---|---|---|---|---|
| RESPONSE 2 FROM VTR | "0"h | CHANGED | VTR SUBDEVICE | 'WIND' | 'STOP' |

FIG. 7C

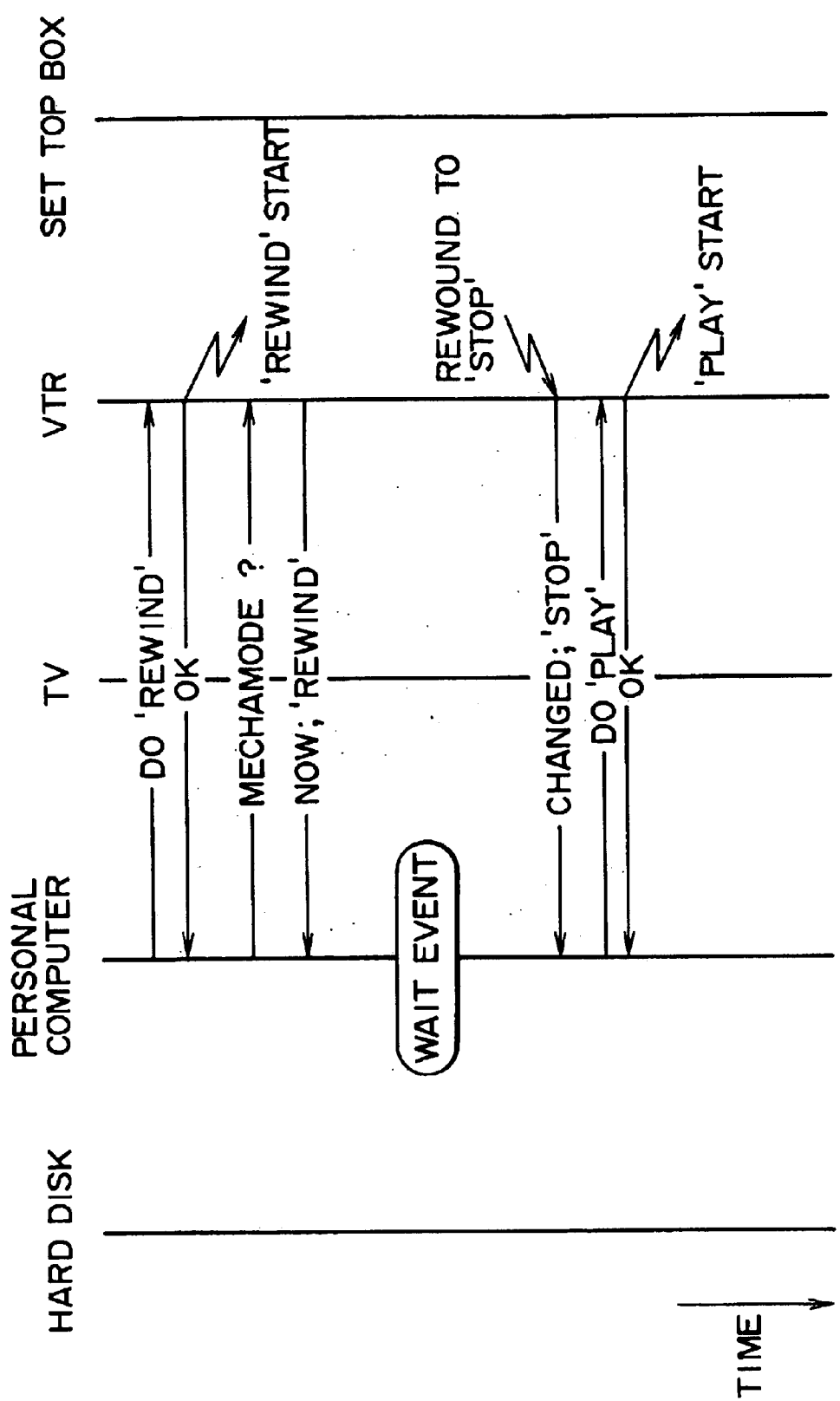

6~9 ··· IEEE 1394 SERIAL BUS

CSP : CYCLE START PACKET
Iso : Iso COMMUNICATION PACKET
Async : Async COMMUNICATION PACKET

FIG. 13A COMMAND FORMAT

| CTS | CT/RC | HA | OPC | OPR | OPR | OPR |
|---|---|---|---|---|---|---|
| "0"h | DEMAND TYPE | DESTINATION IN EQUIPMENT | COMMAND | PARAMETER 1 | PARAMETER 2 | PARAMETER 3 |

FIG. 13B RESPONSE FORMAT

| "0"h | SENDER IN EQUIPMENT | PROCESSED COMMAND | PARAMETER 1 | PARAMETER 2 | PARAMETER 3 |
|---|---|---|---|---|---|
| | RESPONSE TYPE | | | | |

FIG. 13C COMMAND TO VTR

| "0"h | CONTROL | VTR SUBDEVICE | DO 'PLAY' | 'Slow' |
|---|---|---|---|---|

FIG. 13D RESPONSE FROM VTR

| "0"h | ACCEPT | VTR SUBDEVICE | DO 'PLAY' | 'Slow' |
|---|---|---|---|---|

FIG. 13E COMMAND TO VTR

| "0"h | STATUS INQUIRY | VTR SUBDEVICE | TIME CODE | CURRENT VALUE | ? | ? | ? |
|---|---|---|---|---|---|---|---|

FIG. 13F RESPONSE FROM VTR

| "0"h | STABLE | VTR SUBDEVICE | TIME CODE | CURRENT VALUE | "0" HOUR | "25" MINUTE | "49" SECOND | "24" FRAME |
|---|---|---|---|---|---|---|---|---|

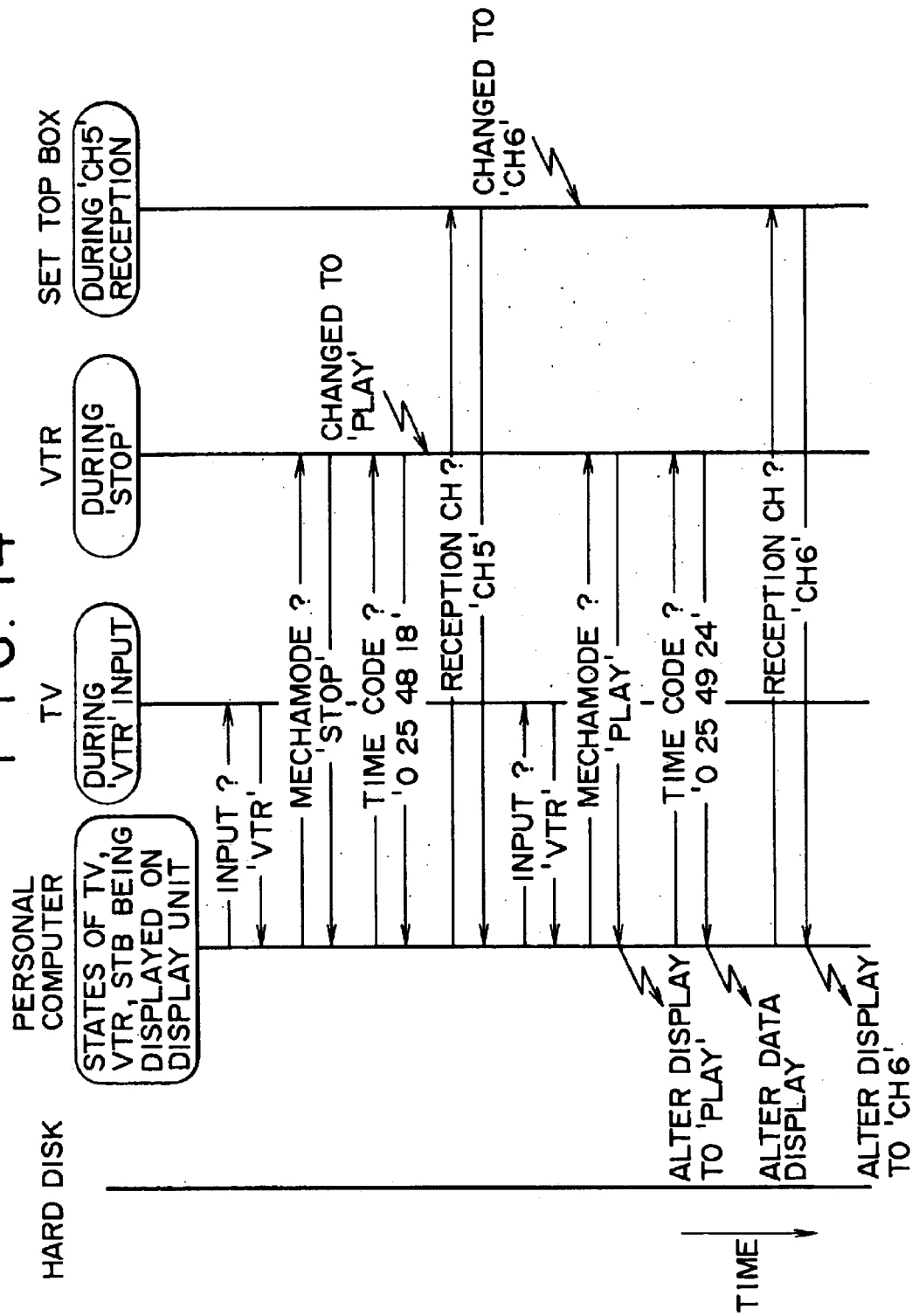

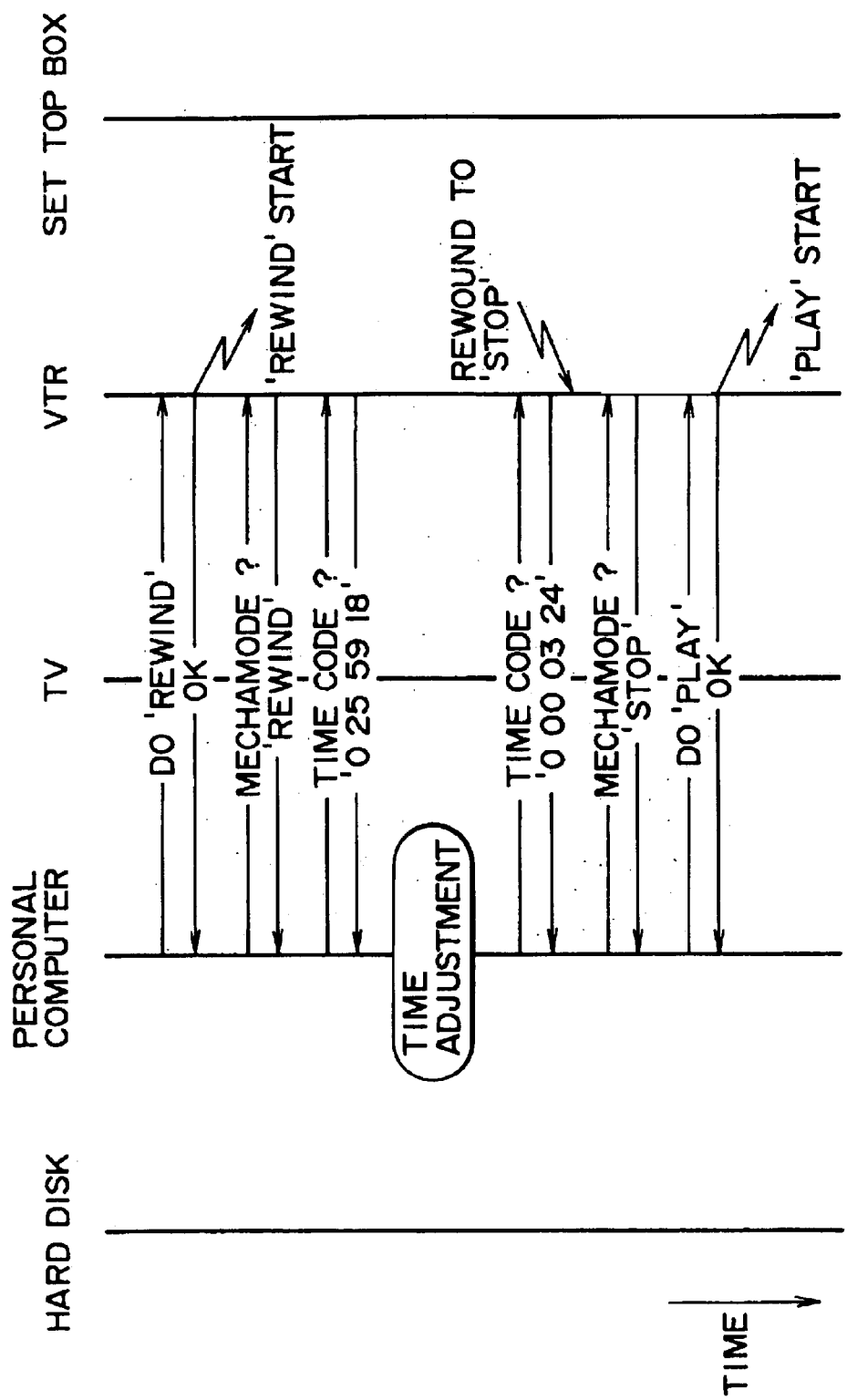

COMMUNICATION CONTROL METHOD AND ELECTRONIC EQUIPMENTS

CROSS REFERENCE TO RELATED APPLICATIONS

This is a continuation of U.S. patent application Ser. No. 08/738,596 filed Oct. 29, 1996, which was abandoned on Jul. 9, 1999.

BACKGROUND OF THE INVENTION

1. Field of the Invention

The present invention relates to a system for performing communication among a plurality of electronic equipments connected with one another by means of communication control buses capable of transmitting a control signal and an information signal included therein such as a serial bus conforming to IEEE-1394 for instance (hereinafter referred to as an IEEE 1394 serial bus), and more particularly to a communication control method and electronic equipments that eliminate useless communication and also make control easier when electronic equipments control the operation of other electronic equipments.

2. Description of Related Art

A system in which a plurality of electronic equipments are connected with one another by means of communication control buses capable of transmitting a control signal and an information signal included therein such as an IEEE 1394 serial bus and the information signal and the control signal are communicated among these electronic equipments is being considered.

FIG. 9 shows an example of such a system. This system is provided with a hard disk unit 1, a personal computer 2, a television receiver (hereinafter referred to as a TV) 3, a video tape recorder (hereinafter referred to as a VTR) 4, and a set top box 5. Further, the hard disk unit 1 and the personal computer 2, the personal computer 2 and the VTR 4, the VTR 4 and the TV 3, and the VTR 4 and the set top box 5 are connected with each other by means of IEEE 1394 serial buses 6 to 9, respectively. Here, #A to #E represent node IDs on the system of the hard disk unit 1, the personal computer 2, the TV 3, the VTR 4 and the set top box 5, respectively.

Transmission of a signal in respective electronic equipments (hereinafter referred to as equipments) within the system is performed by time division multiplexing at every predetermined communication cycle (125 μsec for instance) as shown in FIG. 10. The signal transmission is started when an electronic equipment called a cycle master sends out a cycle start packet showing the starting time of a communication cycle onto the bus.

The configuration of communication in one communication cycle includes two types, one being Iso communication for transmitting an information signal such as video data and audio data isochronously (hereinafter "isochronous" is abbreviated as "Iso") and the other being Async communication for transmitting a control signal such as a control command asynchronously (hereinafter "asynchronous" is abbreviated as "Async"). Further, an Iso communication packet is transmitted before an Async communication packet. It is possible to make a distinction among a plurality of Iso data by assigning channel numbers, 1, 2, 3, ..., n to respective Iso communication packets. After transmission of the Iso communication packet is completed, the period until a next cycle start packet is used for transmitting the Async communication packet.

In the Async communication, a control signal used by a certain equipment when it makes a demand for something to another equipment is called a command, and the side of sending this command being included in a packet is called a controller. Further, the side of receiving the command is called a target. The target sends a packet holding a control signal showing the result of execution of a command (which is called a response) back to the controller as occasion demands.

These command and response are communicated between one controller and one target, and a series of exchanges that are started with transmission of the command and completed with sending back of the response are called command transaction. It has been decided that the target has to return a response as quickly as possible (for example, within 100 ms) after the command is received. The reason for the above is to prevent stagnation of processing when the controller side continues to wait for the response for long and processing is delayed or the response has not been returned because of some obstacle or other.

The controller can make a demand to perform specific action to the target or inquire after the present state of the target. Any equipment in the system can start and terminate the command transaction. Namely, any equipment can act either as a controller or as a target.

FIG. 11 shows a construction of an Async communication packet including a control signal. Both the command and the response have the same construction. In FIG. 11, the data of a packet are transmitted sequentially from top to bottom and left to right.

The packet is composed of a packet header and a data block. Further, standards of all of the packet headers and the data CRC in the data block, that is, the portion applied with halftone have been determined by IEEE 1394, and the contents of the data block are written from an equipment shown by source ID of the packet header to an address shown in destination offset of the equipment shown by the destination ID.

In FIG. 9 for instance, when a command is sent from the personal computer 2 to the VTR 4, the source ID, the destination ID and the destination offset are memory spaces that have been allotted as #B, #D and the area for storing the command in VTR 4, respectively. When it is desired that the personal computer 2 transmits a command to all of the other equipments in the system, 16 bits of the destination ID are set to "all 1". This communication configuration is called broadcast.

In the data block shown in FIG. 11, CTS (command transaction set) shows the type of command language. Further, CT/RC (command type/response code) shows the type of demand in the case of a command, and shows the type of reply to the demand in the case of a response. HA (header address) shows whether the other party for which a demand is made is the whole equipments or it is a subdevice (a functional unit) within the equipments in the case of a command, and HA is the same as the corresponding command in a sense that the other party replies in the case of a response. OPC (operation code) shows a command code, i.e., a concrete demand, and parameters required for the demand are shown with an OPR (operand) following OPC.

FIG. 12 shows a structure of a portion for making exchanges of a command and a response described above taking the VTR among the equipments within the system as an example. This VTR is provided with a VTR device 11 and an IEEE 1394 bus transmission-reception block 12.

The VTR device 11 is composed of a microcomputer, and is provided with a VTR subdevice 13 for performing processing of commands and so on related to a recording/ playback system (not shown) within the VTR, a tuner subdevice 14 for performing processing of commands and so on related to a tuner (not shown) within the VTR, and a timer subdevice 15 for performing processing of commands and so on related to a timer (not shown) within the VTR. These subdevices are formed of softwares of the microcomputer.

The IEEE 1394 bus transmission-reception block 12 detects an Async communication packet received through the bus, and sends a command therein to the VTR device 11. The VTR device 11 has subdevices 13 to 15 operate, when a command is received, acceding to the concrete demand thereof. For example, when an FF (fast feed) command addressed to the VTR subdevice 13 is received, the command is delivered to the VTR subdevice 13. The VTR subdevice 13 executes processing for controlling so as to have a mechanical system of the recording/playback system within the VTR perform FF. Further, the VTR subdevice 13 monitors various status mechamode, time code or the like of the recording/playback system, and generates a response when occasion demands. This response is transmitted to the IEEE 1394 bus transmission-reception block 12 by the VTR device 11. The IEEE 1394 bus transmission-reception block 12 sends out the response to the bus being included in the Async communication packet.

FIG. 13 shows structures of formats of commands and responses and exemplifications of commands and responses with the VTR as a target. As shown in FIG. 13, "0"h is used here as the CTS. For example, a command demanding slow playback for the VTR subdevice 13 within the VTR shown in FIG. 12 is as shown in FIG. 13(c). The response returned against the command is as shown in FIG. 13(d). Further, the command inquiring of the VTR subdevice 13 about hour-minute-second-frame of the present value of time code becomes as shown in FIG. 13(e), and the response returned against the command becomes as shown in FIG. 13(f).

FIG. 14 shows an example of an application in which the personal computer 2 acts as a controller in the system shown in FIG. 9, and inquires about the state of all of other equipments within the system and displays it on its own display unit. This figure will be explained hereinafter.

First, when the personal computer sends a command inquiring of the TV about the input mode thereof to the TV, a response 'VTR' is returned from the TV. Next, when a command inquiring of the VTR about a mechamode of a VTR subdevice to the VTR, a response 'STOP' is returned. Then, when a command inquiring about the time code of the VTR subdevice is sent, a response of '0 hours 25 minutes 49 seconds 24 frames' is returned. Furthermore, when a command inquiring of the set top box about the reception channel is sent to the set top box, a response 'CH6' is returned.

When a command is also sent in a similar manner thereafter, and it is learnt that the mechamode, the time code of the VTR subdevice and the reception channel of the set top box have changed, display on the display unit is altered at that point of time.

FIG. 15 shows an application of "rewinding to the head of a tape and then playing it back" as an example in which a personal computer inquires about the state of the VTR and sends a next command. Description is made with reference to FIG. 15 hereinafter.

First, when the personal computer sends a command demanding the VTR to execute REWIND, the VTR returns a response notifying of an OK on the demand and starts REWIND in the recording/playback system at the same time.

The personal computer sends a command inquiring about a mechamode or a command inquiring about the time code even after the response of an OK on REWIND has been received from the VTR. Then, the personal computer inquires again about the time code after timing is made by forecasting the time of completing REWIND, and sends further a command demanding to set the mechamode to 'PLAY' after a response showing that the mechamode is 'STOP' is returned. The VTR returns, upon receipt of the command, a response notifying of an OK on the demand, and also starts 'PLAY' in the recording/playback system.

In the applications shown in FIG. 14 and FIG. 15, they are structured so that the target returns a response only when the controller sends a command. Therefore, it is required for the controller to send the command frequently and monitor the response thereof when it is desired to confirm that the target is brought into a predetermined state.

Therefore, in case the states of equipments within the system are always displayed as the example shown in FIG. 14, or in case a series of operations are controlled sequentially in a predetermined order as shown in FIG. 15, useless communication is performed frequently as a result, and control from the controller becomes difficult. In such applications, the timing of displaying the change of the state or the timing of performing next control among a series of operations is delayed.

SUMMARY OF THE INVENTION

The present invention has been made in view of such problems, and has for its object to provide a communication control method and electronic equipments that do away with useless communication and also make control easier when the controller controls the target.

In order to solve the above-mentioned subject, a communication control method according to the present invention is characterized in that, in a system in which a plurality of electronic equipments are connected with one another by means of communication control buses capable of including a control signal and an information signal together and the information signal and the control signal are communicated among these electronic equipments, when electronic equipments control the operation of other electronic equipments using a control signal, other electronic equipments make a report on an inside predetermined state change using a control signal.

Here, another electronic equipment (a target) receives a control signal demanding start or stop of a report from an electronic equipment (a controller) on the controlling side, and starts or stops the report in accordance with the control signal. The report on the inside state change can be made either only to the electronic equipment on the controlling side or to all of the equipments within the system. This report destination can be designated by the electronic equipment on the controlling side. Furthermore, it is also possible to structure so that one type of change of an internal state designated from the electronic equipment on the controlling side is reported only once.

Further, an electronic equipment according to the present invention is an electronic equipment used in a system in which a plurality of electronic equipments are connected with one another by means of communication control buses capable of including a control signal and an information signal together and the information signal and the control signal are communicated among these electronic equipments, and comprises a first means for detecting a predetermined state change inside the equipment and a second means for sending the state change detected by the first means to the communication control bus by the control signal.

In an electronic equipment according to the present invention, it is also possible to structure so that a plurality of means for detecting a predetermined state change inside the equipment are provided, and a third means for performing centralized control of a state change detected by the plurality of means.

According to the present invention, the electronic equipment on the controlling side sends a demand either to report an inside predetermined state change or to stop the report to the electronic equipment on the controlled side. The electronic equipment on the controlled side reports, when a predetermined state change has occurred inside, the state change using a control signal. In the electronic equipment on the controlled side, a first means detects the state change and a second means sends the state change to the communication control bus by a control signal.

As described above in detail, according to the present invention, effects described in the following items (1) to (5) are produced.

(1) Since an equipment on the controlled side (a target) makes a report promptly at a point of time when a predetermined state change occurs, it becomes no longer required for an equipment on the controlling side (a controller) to transmit a command frequently in order to monitor the state of equipments on the controlled side. Accordingly, when such an application that a series of operations are controlled in order is executed, control from the equipment on the controlling side becomes easier, and useless communication becomes no longer be made.

(2) Since start and stop of a report can be controlled by an equipment on the controlling side sending a control signal demanding start or stop of the report to an equipment on the controlled side, it is possible to receive the report only when it is required. Further, it is also possible to arrange so that, not all of the equipments within the system, but a predetermined equipment only may receive the report. As a result, when a plurality of equipments exist within the system, it is possible to make the communication control bus not congested.

(3) Control from an equipment on the controlling side becomes easier by providing means for centralized control of detection of the state change inside the equipment.

(4) Communication control becomes simpler and a report on a state change can be realized without altering conventional command processing in a large way by structuring so as to report on one type of state change designated by an equipment on the controlling side only once.

(5) Realization of an application of displaying promptly upon receipt of a report on a state change or an application demanding next operation by utilizing a fact that an equipment of the other party has been brought into a predetermined state.

BRIEF DESCRIPTION OF THE DRAWINGS

FIG. 1 is a diagram showing examples of commands and responses used in the embodiments of the present invention;

FIG. 2 is a diagram showing an example of an application in which a personal computer acts as a controller and the state of all of other equipments in the system is displayed on its own display unit using the commands shown in FIG. 1;

FIG. 3 is a diagram showing an example of an application of "rewinding to the tape head and playing back" using the commands shown in FIG. 1;

FIG. 4 is a diagram showing an example of an application in which the command shown in FIG. 1 is sent from the set top box to the VTR, and the system interlocks therewith in accordance with the event of the VTR;

FIG. 5 is a diagram showing an example of a structure of the equipment in case a subdevice performing centralized control on the event is made independent of other subdevices;

FIG. 6 is a diagram showing examples of formats of commands that are sent to the equipment structured as shown in FIG. 5;

FIG. 7 is a diagram showing other examples of the command and the response used in the embodiment of the present invention;

FIG. 8 is a diagram showing an example of an application of "rewinding to the tape head and playing back" using the command shown in FIG. 7;

FIG. 13 is a diagram showing structures of formats of the commands and responses and exemplifications of commands and responses with the VTR as a target;

FIG. 14 is a diagram showing an example of an application in which a personal computer acts as a controller, and inquires about states of all of other equipments within the system and displays the states on its own display unit; and FIG. 15 is a diagram showing an application of "rewinding to the tape head and playing back" of the VTR.

DESCRIPTION OF THE PREFERRED EMBODIMENTS

An embodiment of the present invention will be described in detail hereinafter with reference to the drawings. Besides, the present embodiment is premised on prior arts shown in FIG. 8 to FIGS. 12.

FIG. 1 shows examples of commands and responses used in the embodiment of the present invention.

(a) of FIG. 1 shows a command demanding the VTR to report (ON) an event. To be concrete, a demand is made to report the change of a mechamode and a time code by generating an event to a controller in the VTR subdevice.

Figure 9:
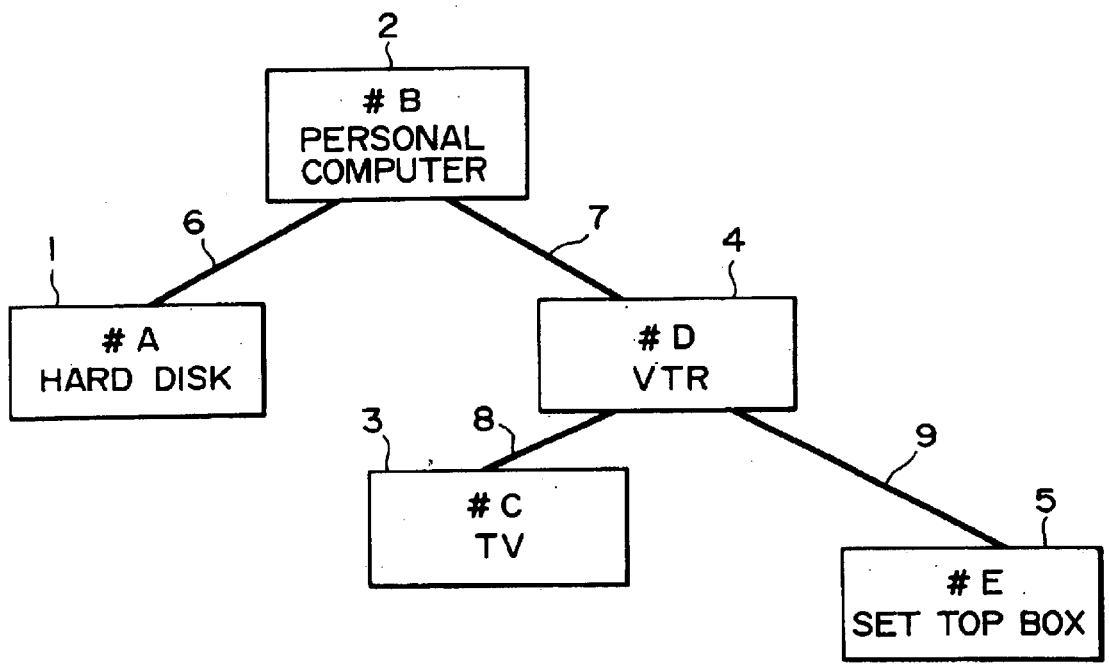
FIG. 9 is a diagram showing an example of a communication system using IEEE 1394 serial buses.
Figure 10:
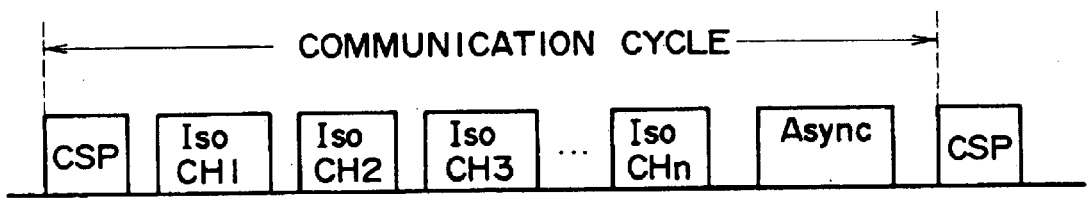
FIG. 10 is a diagram showing an example of data construction on the bus in a communication system using the IEEE 1394 serial bus.
Figure 11:
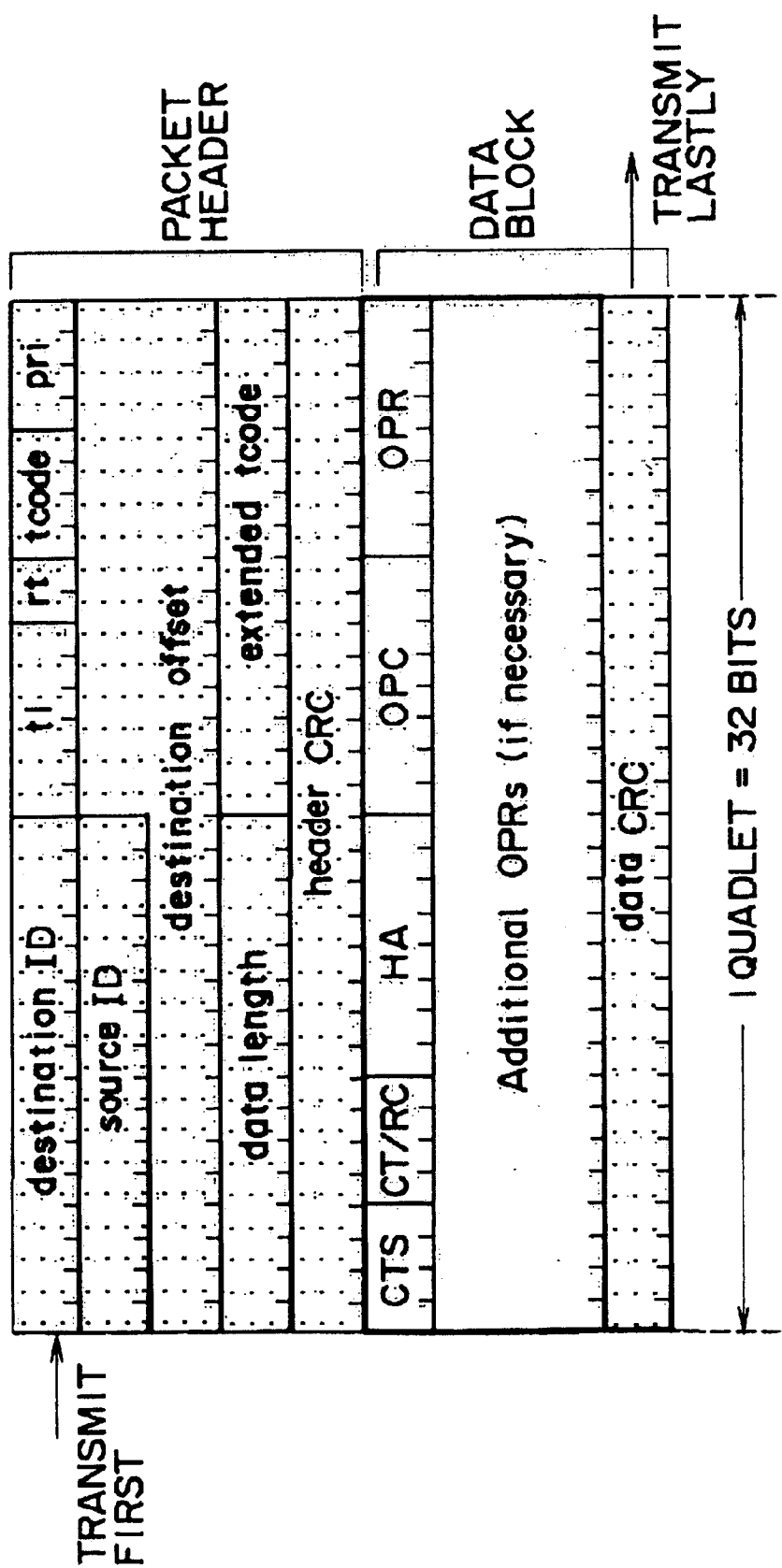
FIG. 11 is a diagram showing the construction of an Async communication packet including a control signal.
Figure 12:
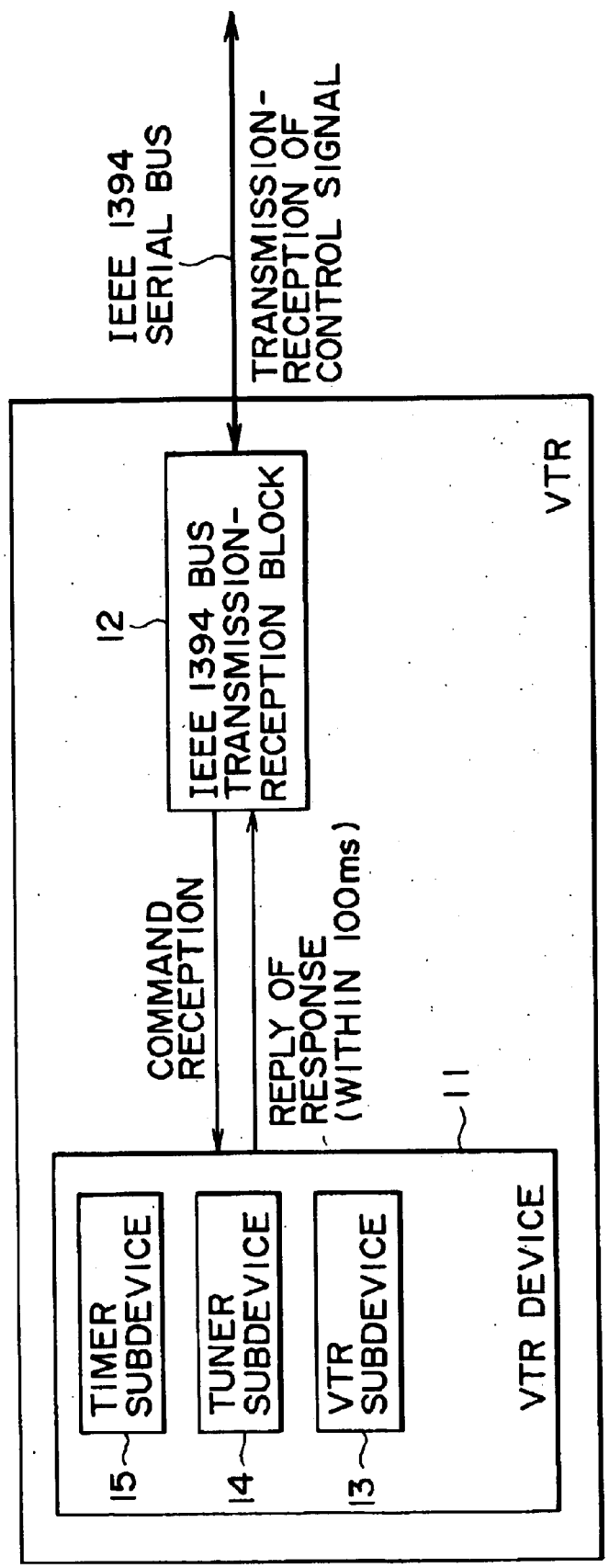
FIG. 12 is a diagram showing an example of a structure of a portion performing exchanges of the commands or the responses in the equipment within the system.

Explaining the processing when the VTR receives this command with reference to FIG. 12, an IEEE 1394 bus transmission-reception block 12 in the VTR sends a command in an Async communication packet received through a bus to a VTR device 11. Since HA of the command is a VTR subdevice 13, the VTR device 11 delivers a command to the VTR subdevice 13.

(b) of FIG. 1 shows a response returned to the controller by the VTR when the command shown in (a) is received. To be concrete, it comprehends that an event is to be reported to the controller when the mechamode and the time code have changed in the VTR subdevice.

(c) of FIG. 1 shows an example of a time code event generated by a VTR subdevice. Explaining the processing that the VTR reports this time code event with reference to FIG. 12, the VTR subdevice 13 monitors the time code of the recording/playback system, and generates a time code event when the time code changes by one second for instance. The VTR device 11 sends this time code event immediately to the IEEE 1394 bus transmission-reception block 12. The IEEE 1394 bus transmission-reception block sends this time code event being included in an Async communication packet.

(d) of FIG. 1 shows a command demanding the TV to stop (OFF) the report on the event related to the input mode, and (e) of FIG. 1 shows a response replying OK for that command.

(f) of FIG. 1 shows a command demanding the set top box to generate an event and make a report when the reception channel is changed. Furthermore, this command demands to broadcast the event, in a word, to report the event to all of the other equipments in the system.

(g) of FIG. 1 shows a response returned to the controller by the set top box when the command shown in (f) is received. (h) of FIG. 1 shows an example of a reception channel event which has been generated by the set top box, which event being generated when the reception of the tuner has changed to the channel 6. When this reception channel event is reported to all of the equipments, the destination ID of the header of the Async communication packet is set to 'all 1'.

In this way, ON/OFF of an event is distinguished from each other by an operation code. Further, distinction is made between whether the other party whom the event is reported by the operand is limited to the controller or is all of the equipments within the system.

FIG. 2 shows an example of an application in which the personal computer 2 acts as a controller and the state of all of other equipments within the system are displayed on its own display unit using commands that turn the event shown in FIG. 1 on. FIG. 2 will be explained hereinafter.

First, although it is not illustrated, the personal computer and the VTR exchange the command for the response shown in (a) and (b) of FIG. 1, the personal computer and the TV exchange the command for the response shown in (d) and (e) of FIG. 1, and the personal computer and the set top box exchange the command for the response shown in (f) and (g) of FIG. 1. Further, the VTR is instructed to generate an event in the case of a change in the mechamode of the VTR subdevice and in the case of a change in the time code (in the unit of one second during 'REC' and 'PLAY' and in the unit of one minute during 'FF' and 'REWIND') and to report to the personal computer which is the controller.

As shown in FIG. 2, when the mechamode changes from 'STOP' to 'PLAY', the VTR immediately generates an event which shows that the mechamode is 'PLAY' and sends it to the personal computer. Explaining with reference to FIG. 12, when a user operates the VTR thereby to change the operation mode of the recording/playback system from 'STOP' to 'PLAY', the VTR subdevice 13 immediately generates an event which shows that the mechamode is 'PLAY'. This event is sent from the VTR device 11 to the IEEE 1394 bus transmission-reception block 12, and sent to the personal computer therefrom through the bus.

Upon receipt of the report on the event, the personal computer alters the mechamode of the VTR displayed on the display unit from 'STOP' to 'PLAY'.

Further, when the reception channel changes from 'CH5' to 'CH6', the set top box immediately generates an event which shows that the reception channel is 'CH6' and send it to the personal computer. Upon receipt of this event, the personal computer immediately alters the reception channel displayed on the display unit from 'CH5' to 'CH6'.

Furthermore, the VTR generates an event which shows hour-minute-second-frame of the time code every time the time code changes in the unit of one minute and sends it to the personal computer. Upon receipt of the report on this event, the personal computer renews the time code displayed on the display unit.

In this way, according to the present embodiment, it is sufficient for the controller to wait for the report on the event received from the target after the command which turns the event on has been exchanged for the response. Therefore, the traffic is decreased markedly as compared with the conventional example shown in FIG. 14, and it becomes possible to display state change promptly if any.

FIG. 3 shows an example of an application of "rewinding to the tape head and playing back" using a command which turns the event shown in FIG. 1 on. Similarly to FIG. 2, exchanges of the command which turns the event on for the response have been completed between the personal computer and other equipments, and the VTR has been instructed to generate an event when there was a change in the mechamode of the VTR subdevice and when there was a change in the time code (in the unit of one second during 'REC' and 'PLAY' and in the unit of one minute during 'FF' and 'REWIND'), and report it to the personal computer which is a controller.

In FIG. 3, when the personal computer sends a command demanding the VTR to execute REWIND, the VTR returns a response notifying of OK for the demand, and also starts REWIND in the recording/playback system within the VTR.

The VTR generates an event during 'REWIND' every time the time code changes in the unit of one minute and reports it to the personal computer. Further, when the mechamode changed from 'REWIND' to 'STOP', an event is generated and reported to the personal computer.

Upon receipt of an event showing that the mechamode has changed to 'STOP' from the VTR, the personal computer sends a command demanding to set the mechamode to 'PLAY' immediately. Upon receipt of this command, the VTR returns a response notifying of an OK for the command, and sets the mode of the recording/playback system to 'PLAY'.

In this way, according to the present embodiment, the personal computer waits for an event showing that the mechamode has changed to 'STOP' and sends a command of 'PLAY' immediately upon receipt of the event. Therefore, the traffic is reduced markedly as compared with the conventional example shown in FIG. 15, and it becomes possible to send a next command promptly when a state change has occurred.

FIG. 4 shows an example of an application in which the command shown in FIG. 1 which turns the event on and demands broadcast is sent from the set top box to the VTR, and the system interlinks in accordance with the event generated by the VTR.

As shown in FIG. 4, first the set top box sends a command demanding to turn an event on and to broadcast the event to the VTR. At this time, the VTR has been instructed to generate an event when on/off of a power supply, a change of the mechamode and a change of the time code (in the unit of one second during 'REC' and 'PLAY', and in the unit of one minute during 'FF' and 'REWIND') have occurred, and to report to all of other equipments within the system.

The set top box sends a command which demands to put a power supply of the VTR on using the timer function thereof. The VTR returns a response showing an OK for the demand of the command, and also puts its own power switch on. Furthermore, an event which shows that the power supply has been put on is reported to all of other equipments within the system, i.e., the set top box, the TV, the personal computer and the hard disk unit by means of broadcast communication.

Upon receipt of an event which shows that the power supply of the VTR is put on, the TV puts its own power switch on and sets the input mode to 'VTR'. Upon receipt of an event which shows that the power supply of the VTR has been put on, the personal computer alters the power supply state of the VTR displayed on the display unit from off to on.

Upon receipt of an event which shows that the power supply of the VTR has been put on, the set top box sends a command which demands the VTR to set the mechamode to 'REC' to the VTR. The VTR returns a response showing an OK for the command, and sets the operation mode of the inside recording/playback system to 'REC'. Then, an event showing that the mechamode has changed to 'REC' is reported to all of other equipments within the system by means of broadcast communication.

Upon receipt of an event which shows that the mechamode of the VTR has become 'REC', the personal computer alters the mechamode state of the VTR displayed on the display unit to 'REC'.

The VTR generates an event every time the time code changes in the unit of one minute, and reports it to all of other equipments within the system by means of broadcast communication. Upon receipt of an event which shows that the time code has changed, the personal computer renews the time code of the VTR displayed on the display unit. Further, the set top box monitors whether the tape runs out or not during timer picture recording.

FIG. 5 shows a structure of an equipment when a subdevice which performs centralized control of events is made independent of other subdevices taking a VTR as an example. This VTR is provided with a VTR device 21 and an IEEE 1394 bus transmission-reception block 22. In the VTR device 21 are provided a VTR subdevice 23, a tuner subdevice 24 and a timer subdevice 25. These have basically the same structures as those of corresponding parts in the VTR shown in FIG. 10, and perform the same operation as the above- mentioned parts.

Furthermore, an event processing subdevice 26 for centralized control of events is provided in the VTR device 21. When a subdevice designated by a parameter 1 of a command demanding to turn an event on/off generates an event related to the item designated by the parameter 2 or 3, the event processing subdevice 26 transmits the event to the IEEE 1394 bus transmission-reception block 22 immediately. The IEEE 1394 bus transmission-reception block 22 puts this event in a packet and transmits the packet to the other party demanded by a controller (only a controller or all of the equipments).

FIG. 6 shows examples of formats of commands to be sent to the equipments structured as shown in FIG. 5. As shown in FIG. 6, the formats are featured by that HA of each command is an event processing subdevice and the subdevice for generating an event by the parameter 1 is designated.

FIG. 7 shows another example of the command and the response used in the embodiment of the present invention. This command/response is referred to as Report Inquiry command/response, and is not to demand on/off of the event as heretofore explained, but to report specific one type of state change (event) only once.

This report inquiry command is realized in a form of adding to a conventional status inquiry command. Namely, the target which has received a report inquiry command replies designated one type of present state in the same method as the response to the status inquiry command, and, when a state change occurs thereafter, the target replies the changed state only once, thus completing processing. CT of this command is 'Report Inquiry', and RC of the response is 'NOW' when the present state is reported and is 'CHANGED' when it is reported that the state has changed.

(a) of FIG. 7 shows a command demanding the VTR to report the state change of the mechamode only once. Further, (b) of FIG. 7 shows a response for reporting that the present mechamode is in a 'REWIND' state. Furthermore, (c) of FIG. 7 is a response for reporting that the mechamode has changed to 'STOP'.

FIG. 8 shows an example of an application of "rewinding to the head of a tape and playing back the tape" using the report inquiry command shown in FIG. 7.

In FIG. 8, when the personal computer first sends a command demanding to execute REWIND to the VTR, the VTR returns a response notifying of an OK for the demand and starts REWIND in the recording/playback system within the VTR at the same time.

Next, the personal computer sends the report inquiry command shown in (a) of FIG. 7 to the VTR. Upon receipt of the report inquiry command, the VTR returns the response shown in (b) of FIG. 7.

Next, when the mechamode changes to 'STOP', the VTR generates an event and returns the response shown in (c) of FIG. 7 to the personal computer.

Upon receipt of an event showing that the mechamode has changed to 'STOP' from the VTR, the personal computer sends immediately a command demanding to set the mechamode to 'PLAY' to the VTR. When this command is sent, the VTR returns a response, notifying of an OK for the command and sets the mode of the recording/playback system to 'PLAY'.

Since it is possible to receive the report on a necessary state change only when occasion demands by using the report inquiry command, the target does no longer report a useless event. Further, since command transaction is terminated with the report inquiry command and the response in twice responding to the command, communication control becomes simpler than a method of putting an event on/off. Furthermore, the report on the event can be realized without changing conventional command processing in a large way.

What is claimed is:

1. A communication control method in a system in which a plurality of electronic devices are interconnected by a communication control bus for carrying a plurality of control signals and information signals among said plurality of electronic devices, said method comprising:

receiving a control signal of said plurality of control signals representing a command to transmit a status of an electronic device of said plurality of electronic devices, said command requesting said status to be transmitted if there is a change of status of said electronic device of one of a predetermined types of status changes;

starting a command transaction when receiving said control signal;

sending a first response signal to at least a device that sends said control signal, the first response signal indicating acceptance of said control signal and representing the current status of said electronic device;

detecting the status change of said electronic device only once after receipt of the control signal;

sending a second response signal representing the detected status change via said communication control bus if the status change has been detected, wherein the status change is transmitted only if the status change is of a predetermined type designated by said command; and closing said command transaction when sending said second response signal automatically.

2. An electronic device for use in a system having a plurality of electronic devices interconnected by a communication control bus for carrying a plurality of control signals and information signals among said plurality of electronic devices, said electronic device comprising:

first means for receiving a control signal of said plurality of control signals representing a command to transmit a status of said electronic device of said plurality of electronic devices, said command requesting said status to be transmitted by said first means if there is a change of status of said electronic device of one of a predetermined types of status changes;

means for starting a command transaction when receiving said control signal means for sending a first response signal to at least a device that sends said control signal, the first response signal indicating acceptance of said control signal and representing the current status of said electronic device; and second means for detecting the status change of said electronic device only once after receipt of the control signal, said first means sending a second response signal representing the detected status change via said communication control bus in response to the detection by said second means, the status change being transmitted only if the status change is of a predetermined type designated by said command, said first means closing said command transaction when sending said second response signal automatically.

* * * * *